US007433164B2

(12) United States Patent
Chu

(10) Patent No.: US 7,433,164 B2
(45) Date of Patent: Oct. 7, 2008

(54) CEILING FAN MOTOR CONTROL MODULE

(76) Inventor: Hui-Yen Chu, No. 348-8, Feng Pei St., Feng Yuan City, Taichung Hsien (TW)

( * ) Notice: Subject to any disclaimer, the term of this patent is extended or adjusted under 35 U.S.C. 154(b) by 182 days.

(21) Appl. No.: 11/542,117

(22) Filed: Oct. 4, 2006

(65) Prior Publication Data
US 2008/0043384 A1   Feb. 21, 2008

(30) Foreign Application Priority Data
Aug. 16, 2006   (TW) .............................. 95214485 U

(51) Int. Cl.
*H02H 7/08* (2006.01)
(52) U.S. Cl. .............................. 361/23; 361/1; 361/500; 361/540; 318/432; 318/434; 340/635; 324/414
(58) Field of Classification Search ................. 318/434, 318/432; 361/23, 500, 540; 340/635; 324/415
See application file for complete search history.

(56) References Cited

U.S. PATENT DOCUMENTS

| | | | | |
|---|---|---|---|---|
| 3,727,103 A * | 4/1973 | Finch et al. ................... 361/30 |
| 4,376,261 A * | 3/1983 | von der Heide et al. . 318/400.04 |
| 4,540,921 A * | 9/1985 | Boyd et al. ............ 318/400.09 |
| 5,557,182 A * | 9/1996 | Hollenbeck et al. ......... 318/432 |
| 6,271,638 B1 * | 8/2001 | Erdman et al. .......... 318/400.01 |
| 6,414,455 B1 * | 7/2002 | Watson ........................ 318/432 |
| 6,479,957 B1 * | 11/2002 | Erdman et al. .......... 318/400.22 |
| 7,304,452 B2 * | 12/2007 | Nagai et al. .................. 318/811 |
| 2003/0098660 A1 * | 5/2003 | Erdman et al. ............... 318/254 |

* cited by examiner

*Primary Examiner*—Rita Leykin
(74) *Attorney, Agent, or Firm*—Rosenberg, Klein & Lee

(57) ABSTRACT

A ceiling fan motor control module includes a digital core controller coupled to a brushless motor for computing, processing, transmitting and controlling signals and providing a soft start and stop function, a back stage output device for receiving signals from the digital core controller and modulating the voltage to a predetermine operating value for driving the brushless motor, a protection control device for receiving and detecting signals from each power supply, back stage output device and brushless motor to effectively provide an automatic tripping protection, a signal indication module for receiving signals from the digital core controller to indicate the current status of the digital core controller, and an interface processing device installed between each power supply and the digital core controller for receiving a feedback signal and a control command of the digital core controller, such that the protection control device can automatically and effectively disconnect the output and stop the operation of the brushless motor, achieve the overall control module protection function, extend the life expectancy and lower the manufacturing cost.

8 Claims, 4 Drawing Sheets

CEILING FAN MOTOR CONTROL MODULE

FIELD OF THE INVENTION

The present invention relates to a control module, and more particularly to a control module with a protection function applied to a ceiling fan for controlling and driving a brushless motor by a digital core controller, and also using a protection control device for an effective detection and an automatic power disconnection, so as to stop the operation of the motor.

BACKGROUND OF THE INVENTION

The trend of adopting a circuit protection function in electronic products, particularly electric appliances becomes significant, and its application generally produces heat energy or kinetic energy by electric power. A poor design or an improper use may jeopardize our life or damage our properties, and thus designs for protecting electric appliances become increasingly important.

Related protection devices of the related circuit are basically divided into different overload detection modes: over voltage protection (OVP), over current protection (OCP), short circuit protection, and overheat protection, etc. The present invention focuses on the technology and design of the control modes for the voltage protection and current protection functions.

As to voltage protection, its main function is to assure a stable power supply and a normal range of voltage and reduce over voltage or under voltage to prevent possible damages to the products or any other accident caused by over voltage. The function of current protection devices is to detect whether or not the current output value falls into a normal range. If an output current exceeds a normal rated power, then the output current will be restricted or shut down to avoid damages caused by an overloaded current. In another case, the current output will be shut down to avoid damages, if a load current exceeds the normal load caused by a bad component.

SUMMARY OF THE INVENTION

In view of the shortcomings of the prior art, the inventor of the present invention based on years of experience to conduct extensive researches and experiments, and finally developed a ceiling fan motor control module in accordance with the present invention.

Referring to FIGS. 4 and 5 for a switch circuit 90 having a current detection function, the switch circuit 90 includes a primary switch comprised of a MOSFET that conducts a voltage to indicate the properties of a resistor, and the gate of the primary switch is coupled to a drive circuit G(91) and the drain of the primary switch is coupled to a constant potential D(92) and the source of the primary switch is coupled to a load circuit S(93). The switch circuit 90 acts as a drive switch of a motor when the switch circuit 90 is coupled to the motor. FIG. 3 shows a schematic view of the status of using a plurality of primary MOSFET switches.

Regardless of the traditional designs of a single MOSFET chip or a multiple of MOSFET chips used in the switch module of a motor, only the function of driving or stopping switch is provided to the motor, but the functions of detecting, computing, processing or protecting the circuit are not provided. Therefore, the application of the prior art comes with low safety, and related components may be damaged easily by overloaded currents or results in a short life. In view of the foregoing shortcomings, the present invention provides an improved motor control module structure.

To overcome the foregoing shortcomings, the present invention discloses a ceiling fan motor control module coupled to a brushless motor, and the motor control module comprises: a digital core controller coupled to a brushless motor for computing, processing, transmitting and controlling signals and providing a soft start and stop function, a back stage output device for receiving signals from the digital core controller and modulating the voltage to a predetermined operating value for driving the brushless motor, a protection control device for receiving and detecting signals from each power supply, back stage output device and brushless motor to effectively provide an automatic tripping protection, a signal indication module for receiving signals from the digital core controller to indicate the current status of the digital core controller, and an interface processing device installed between each power supply and the digital core controller for receiving a feedback signal and a control command of the digital core controller, such that the protection control device can automatically and effectively disconnect the output and stop the operation of the brushless motor, achieve the overall control module protection function, extend the life expectancy and lower the manufacturing cost.

Therefore, it is a primary objective of the present invention to provide a ceiling fan motor control module that has a protection control device for effectively detecting the voltage and current status of an overall control module circuit and giving an instruction of providing an automatic tripping protection when there is an underload or an overload.

A secondary objective of the present invention is to provide a ceiling fan motor control module that has a signal indication module for warning and noticing a user if a breakdown occurs.

A further objective of the present invention is to provide a ceiling fan motor control module that adopts the design of using a Hall Effect component with a digital core controller to achieve a smart detection and solve the break or detachment of a conducting wire by the continuous magnetism of the Hall Effect component.

Another further objective of the present invention is to provide a ceiling fan motor control module that has a remote control module for controlling a digital core controller at a remote end by a wireless transmission method within a range, so as to control driving or stopping the operation of the brushless motor in a very convenient manner.

BRIEF DESCRIPTION OF THE DRAWINGS

The objectives, shape, structure, apparatus, characteristics and effects will become apparent by the detail description together with the accompanying drawings as follows.

DETAILED DESCRIPTION OF THE PREFERRED EMBODIMENTS

Figure 1:
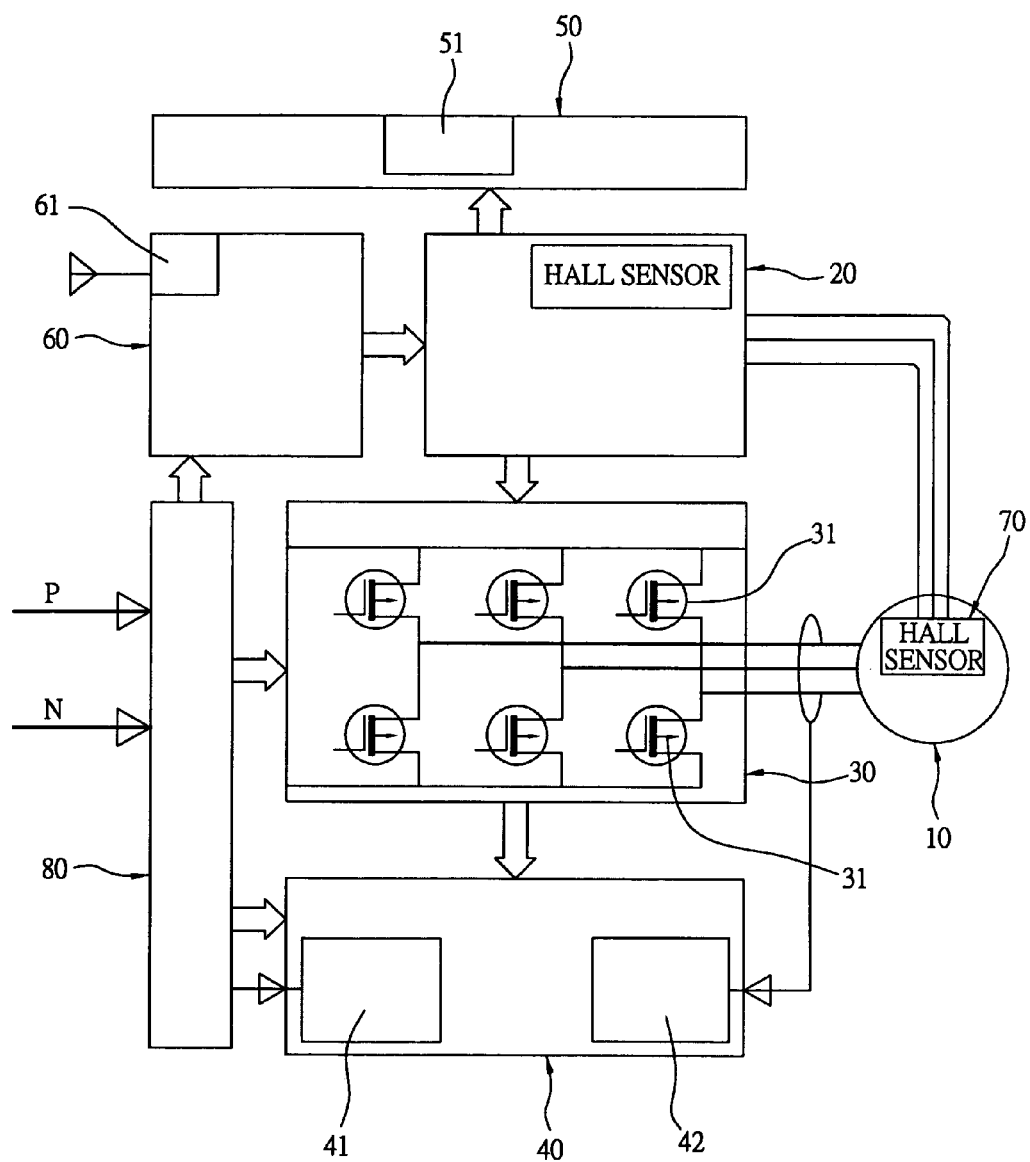
FIG. 1 is a flow chart of a preferred embodiment of the present invention.
Figure 2:
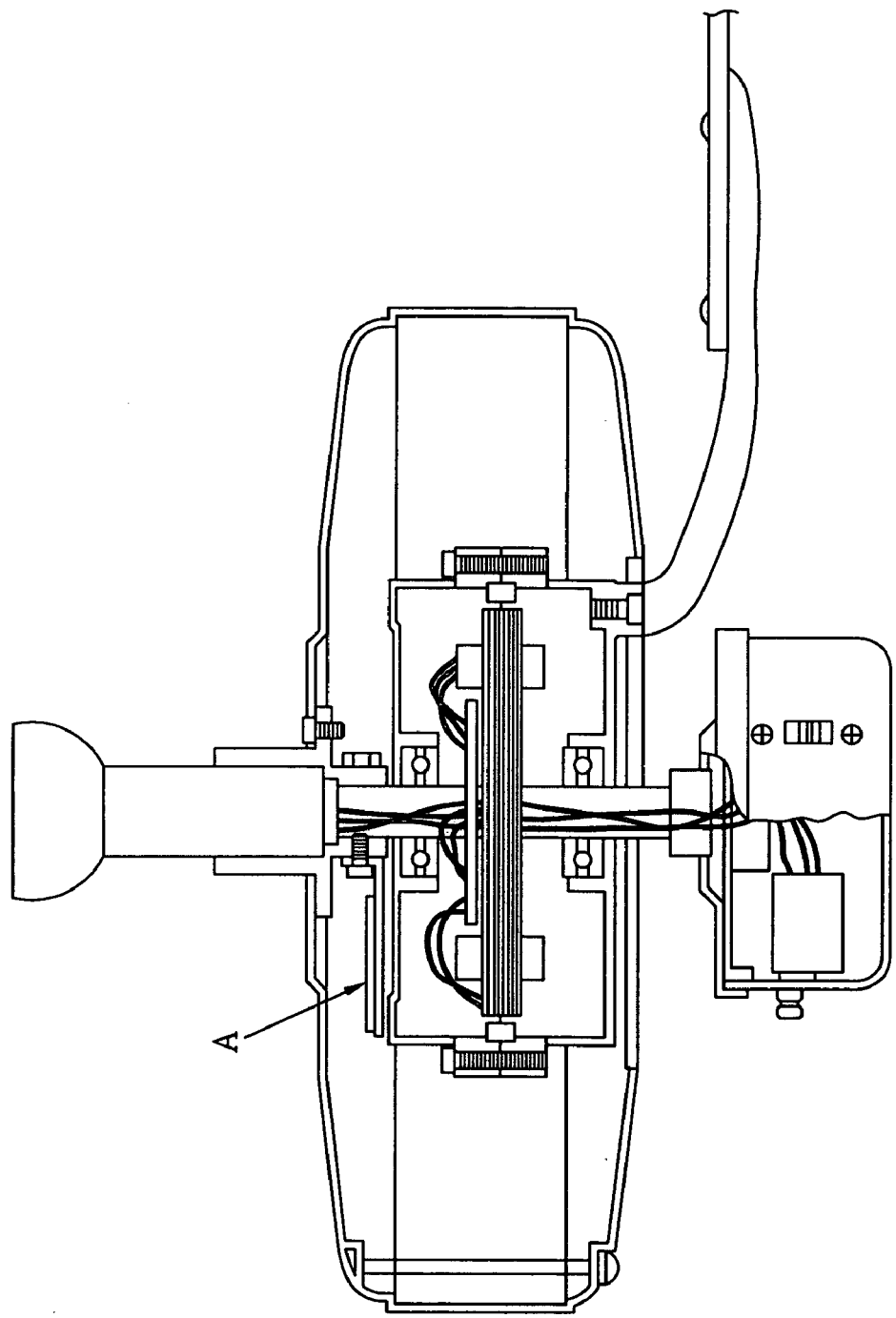
FIG. 2 is a schematic view of an application in accordance with a preferred embodiment of the present invention.

Referring to FIGS. 1 and 2, a ceiling fan motor control module A coupled to a brushless motor 10 comprises a digital core controller 20, a back stage output device 30, a protection control device 40, a signal indication module 50 and an interface processing device 60.

The digital core controller 20 is a high-speed digital processor coupled to the brushless motor 10 and capable of effectively computing, processing, transmitting and controlling the signal and providing the brushless motor a soft start and stop function.

The back stage output device 30 can receive a signal from the digital core controller 20 and effectively adjust a voltage to a predetermined operating value of the brushless motor 10 to facilitate driving the brushless motor 10; six metal oxide semiconductor field effect transistors (MOSFET) 31 with a voltage resisting function are provided for circuit compensation, open circuit and overload circuit protection functions.

The protection control device 40 can receive and detect a signal from a power supply 80, a back stage output device 30 and a brushless motor 10 and can transmit the signal to the digital core controller 20, such that if the detected signal is determined to be exceeding a predetermined range or operating at an abnormal status, the digital core controller 20 will instruct providing an automatic tripping protection and stopping the operation of the brushless motor 10. The protection control device 40 having a voltage detection module 41 and coupled to the power supply 80 is provided for immediately providing an automatic tripping protection if the predetermined value of the voltage has not been reached in a predetermined time. A current detection module 42 is coupled to the brushless motor 10 for detecting its current value and operating condition to effectively provide an automatic tripping protection after a decision is made.

The signal indication module 50 can receive a signal from the digital core controller 20 and has a lamp module 51 for indicating the current status of the digital core controller 20. The lamp module 51 comprises a red light and a green light (not shown in the figure), and the red light is lit when the digital core controller 20 is at an abnormal condition, and the green light is lit when the digital core controller 20 is at a normal condition.

The interface processing device 60 installed between each power supply 80 and the digital core controller 20 has signal output and input contact points for receiving a feedback signal and a control command of the digital core controller 20. The interface processing device 60 installs a remote control module 61 for performing a wireless transmission between a transmitter and a receiver and transmitting the signal to the digital core controller 20. The transmitted signal is a computing instruction, a logic instruction, a direction change instruction, and a breakdown output message.

With the foregoing components, the protection control device 40 can achieve the effects of automatically and effectively disconnecting the output power, stopping the operation of the brushless motor 10, achieving the overall control module protection function, extending the life expectancy and lowering the manufacturing cost.

To further illustrate the structural characteristics, technical measures and expected effects of the present invention, the applications of the present invention are described as follows:

The present invention uses the protection control device 40 to satisfy the requirements for the voltage and current protection, such that if the current and voltage are at a normal condition, the green light of the lamp module 51 will be lit to indicate a safe condition that the digital core controller 20 is currently at a normal condition. If the voltage protection is executed, then the voltage detection module 41 is used for detecting whether or not the output voltage of the power supply 80 has reached a normal rated voltage value in a predetermined time. If the output voltage is overloaded or underloaded, then the protection control device 40 will be started and tripped immediately for a circuit protection status. By then, the red light of the lamp module 51 is lit to warn that the digital core controller 20 is at an abnormal condition, If the current protection is executed, the current detection module 42 will be used for detecting the present current value and operating status of the brushless motor 10. if the signal indicates an underload or an overload of the current value, the protection control device 40 will be started and tripped for a circuit protection status. By then, the red light of the lamp module 51 is lit to warn the present brushless motor 10 which is at an abnormal condition.

The present invention applies a control module to a ceiling fan motor for effectively detecting the voltage and current status of the circuit of an overall control module and transmitting the signal to the digital core controller 20. After the signal is computed, processed and determined, the protection control device 40 will provide an automatic tripping protection and stop the operation of the brushless motor 10 if an underload or an overload occurs, such that the circuit and related components are in a protection status and notice users about the breakdown. Thus, the invention can effectively enhance the life expectancy and the application safety.

It is noteworthy to point out that a Hall effect component 70 is installed between each digital core controller 20 and the brushless DC motor 10 for feeding back a detected position signal to the digital core controller 10 as a basis for determining the operating speed of the brushless DC motor 10 and providing a smart sensing effect by its continuous magnetism. In addition, the remote control module 61 can control the digital core controller in a range by a wireless transmission method for driving or stopping the operation of the brushless motor 10 in a very convenient manner.

There are two main detection methods of the Hall effect component 70, and one is to install a Hall sensor in the coil for a phase detection, and another is to mount a Hall sensor onto a small printed circuit board (PCB) and secure the PCB in the brushless motor for detection. Both methods require using a conducting wire to connect the signals to the digital core controller 20 for the computation. In the connecting method used in the present invention, three groups of Hall sensors are installed under the module for a phase detection, and such design can save manufacturing time for manufacturing the brushless motor 10 and also can solve the break and disconnection problems of the conducting wire.

Figure 3:
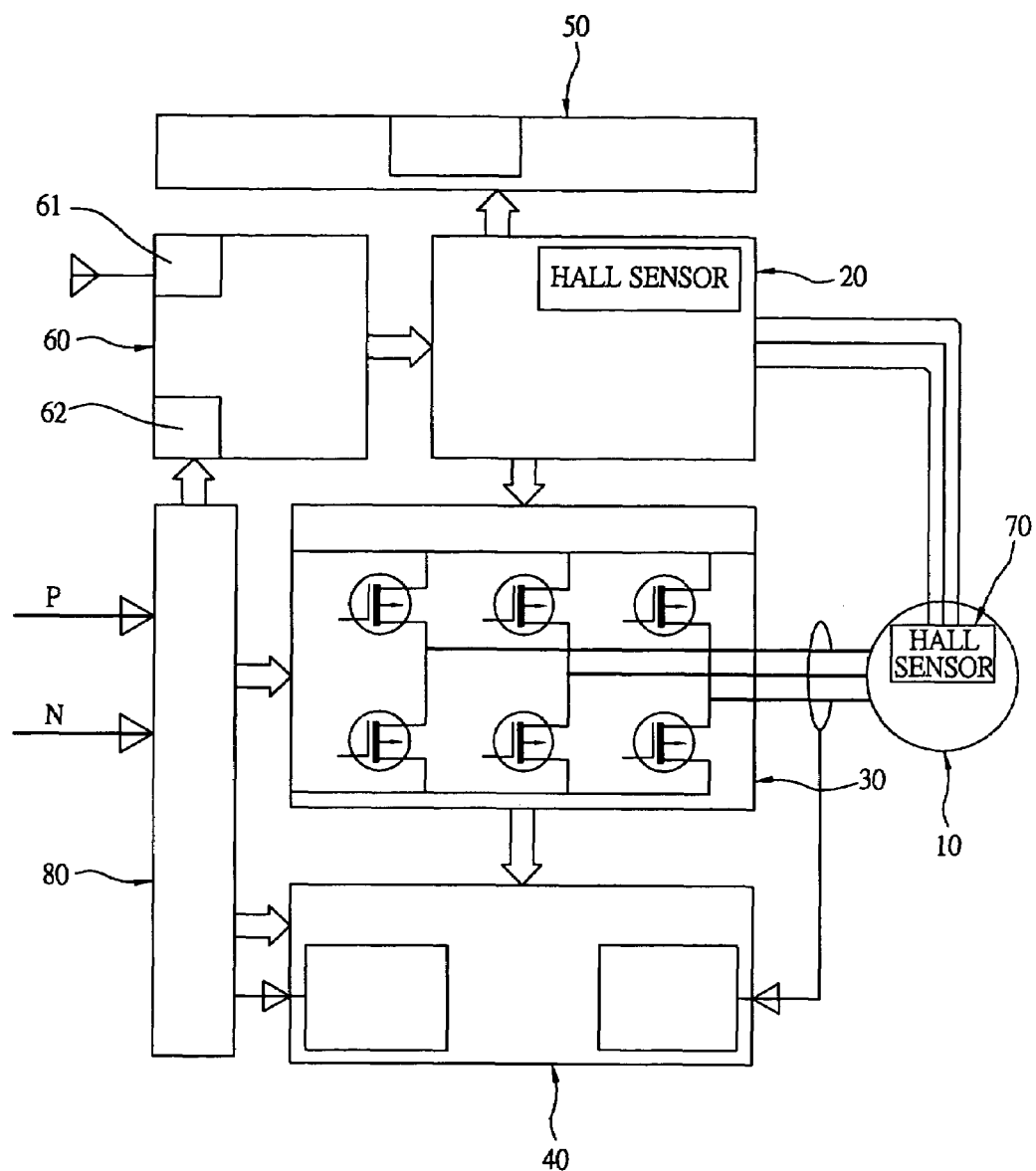
FIG. 3 is a flow chart of another preferred embodiment of the present invention.
Figure 4:
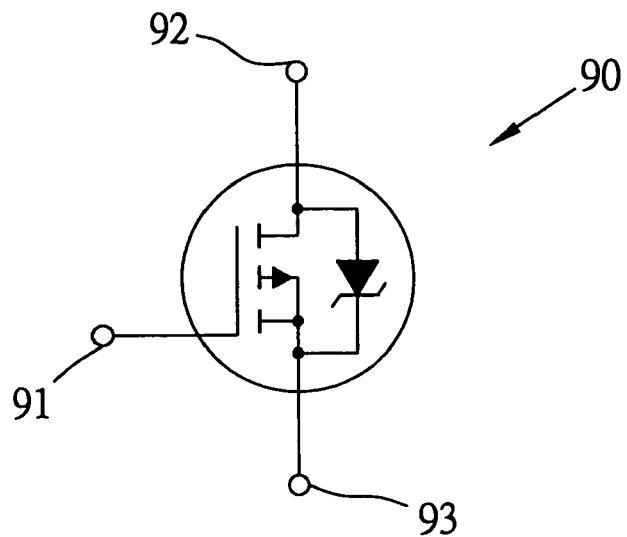
FIG. 4 is a schematic view of controlling a traditional structure.
Figure 5:
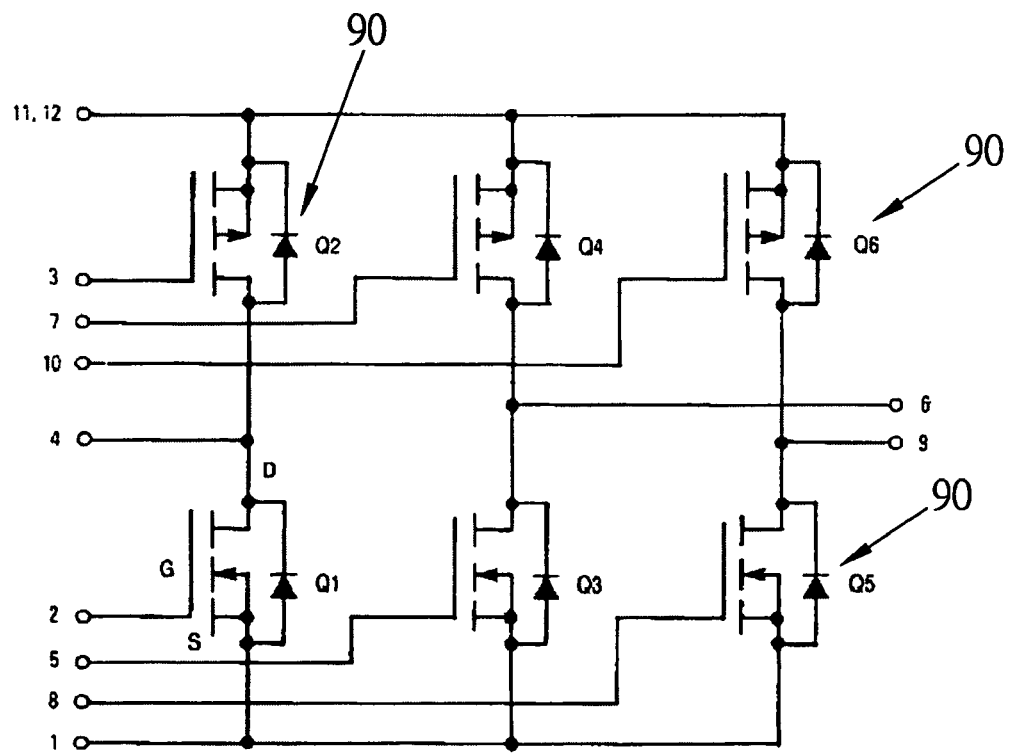
FIG. 5 is a schematic view of a framework of a traditional control system.

Referring to FIG. 3 for another preferred embodiment of the present invention, the interface processing device 60 further installs a speed modulation module 62 for using a potentiometer capable of adjusting a resistance value to adjust and control the voltage, so as to achieve the function of adjusting the speed of a stepless operation of the brushless motor 10.

In summation of the description above, the ceiling fan motor control module provided by the present invention includes a voltage and current protection function, not only can notice the users about the breakdown, but also can automatically and quickly disconnect the output and immediately stop the operation of the motor, so as to achieve a circuit protection for the overall module and related components. Therefore, the invention can enhance the life expectancy and safety. The ceiling fan motor control module of the invention is very useful and convenient, and definitely achieves the expected objective and enhances the performance over the prior art. The invention further complies with the patent application requirements and is duly filed for the patent application.

While the invention has been described by means of a specific numerous modifications and variations could be made thereto by those skilled in the art without departing from the scope and spirit of he invention set forth in the claims.

What is claimed is:

1. A ceiling fan motor control module, coupled to a brushless motor, comprising:

a digital core controller, being a high-speed digital processor coupled to said brushless motor and capable of effectively computing, processing, transmitting and controlling a signal, and providing a soft start and stop function for said brushless motor;

a back stage output device, for receiving a signal from said digital core controller and effectively modulating the voltage to a predetermined operating value of said brushless motor to facilitate driving said brushless motor;

a protection control device, for receiving and detecting a signal from a power supply, the back stage output device and the brushless motor, and transmitting said signal to said digital core controller, such that if said signal is determined to be exceeding a predetermined range or operating at an abnormal condition, said digital core controller will give an instruction to provide an automatic tripping protection and stop the operation of said brushless motor;

a signal indication module, for receiving a signal from said digital core controller, and having a lamp module for indicating the current status of said digital core controller;

an interface processing device, installed between said each power supply and said digital core controller, and having signal output and input contact points for receiving a feedback signal and a control command of said digital core controller; such that said protection control device can achieve the effects of automatically and effectively disconnecting the output, stopping the operation of said brushless motor, achieving an overall control module protection function, extending the life expectancy and lowering the manufacturing cost.

2. The ceiling fan motor control module of claim 1, wherein said protection control device includes a voltage detection module coupled to a power supply for immediately providing an automatic tripping protection if a voltage has not reached a predetermined value in a predetermined time; a current detection module coupled to said brushless motor for detecting its current value and operating status to determine whether or not to provide an automatic tripping protection.

3. The ceiling fan motor control module of claim 1, wherein said back stage output device installs at least one metal oxide semiconductor field effect transistor (MOSFET) with a voltage resisting function for providing circuit compensation, open circuit and overload circuit protection functions.

4. The ceiling fan motor control module of claim 1, wherein said signal indication module uses said lamp module to indicate the status of said digital core controller, and said lamp module comprises a red light and a green light, and said red light is lit when said digital core controller is at an abnormal condition, and said green light is lit when said digital core controller is at a normal condition.

5. The ceiling fan motor control module of claim 1, wherein said interface processing device has a speed modulation module for using a potentiometer capable of adjusting a resistance value to modulate and control a voltage to achieve the function of controlling and adjusting the speed of a stepless operation of said brushless motor.

6. The ceiling fan motor control module of claim 1, wherein said interface processing device installs a remote control module for transmitting a signal to said digital core controller by a wireless transmission between a transmitter and a receiver.

7. The ceiling fan motor control module of claim 6, wherein said transmitted signal is a computation instruction, a logical instruction, a direction change instruction, and a failed output.

8. The ceiling fan motor control module of claim 1, further comprising a Hall effect component installed between said each digital core controller and said brushless DC motor for feeding back a detected position signal to said digital core controller as a basis for determining the operating speed of said brushless DC motor by using the continuous magnetism of said Hall effect component.

* * * * *